US012728519B2

(12) United States Patent
Gross

(10) Patent No.: US 12,728,519 B2
(45) Date of Patent: Sep. 8, 2026

(54) DYNAMICALLY RECONFIGURABLE ROBOT

(71) Applicant: Idealab Studio, LLC, Pasadena, CA (US)

(72) Inventor: William Tod Gross, Pasadena, CA (US)

(73) Assignee: Idealab Studio, LLC, Pasadena, CA (US)

(*) Notice: Subject to any disclaimer, the term of this patent is extended or adjusted under 35 U.S.C. 154(b) by 127 days.

(21) Appl. No.: 18/516,570

(22) Filed: Nov. 21, 2023

(65) Prior Publication Data

US 2024/0165789 A1 May 23, 2024

Related U.S. Application Data

(60) Provisional application No. 63/384,916, filed on Nov. 23, 2022.

(51) Int. Cl.
*B25J 5/00* (2006.01)
*B25J 11/00* (2006.01)
*B25J 19/00* (2006.01)

(52) U.S. Cl.
CPC ............ *B25J 5/007* (2013.01); *B25J 11/008* (2013.01); *B25J 19/005* (2013.01)

(58) Field of Classification Search
None
See application file for complete search history.

(56) References Cited

U.S. PATENT DOCUMENTS

2015/0127146 A1* 5/2015 Carlson .................. B25J 9/1617
700/245
2016/0334801 A1* 11/2016 Ratanaphanyarat ..... B25J 5/007
2017/0057081 A1* 3/2017 Krohne ................ B25J 11/0085
2017/0100837 A1* 4/2017 Zevenbergen ....... G05D 1/0225
2019/0248007 A1* 8/2019 Duffy ..................... B25J 9/1653
2019/0287063 A1* 9/2019 Skaaksrud ........... G06Q 10/083
2021/0116889 A1 4/2021 Keravala et al.
2022/0142422 A1* 5/2022 Giarritta ............. A47L 11/4025
2023/0010426 A1* 1/2023 Coyne ...................... B25J 9/161

FOREIGN PATENT DOCUMENTS

JP 2007-068972 A 3/2007
KR 10-2431336 B1 8/2011
KR 10-2019-0080208 A 7/2019
KR 10-2022-0028351 A 3/2022

OTHER PUBLICATIONS

International Search Report and Written Opinion dated Mar. 29, 2024, received in International Patent Application No. PCT/2023/080785, in 12 pages.

* cited by examiner

*Primary Examiner* — Khoi H Tran
*Assistant Examiner* — Dairon Estevez
(74) *Attorney, Agent, or Firm* — Knobbe, Martens, Olson & Bear LLP

(57) ABSTRACT

A dynamically reconfigurable robot includes a base selected from a plurality of different bases, one or more tools selected from a plurality of different tools, and a battery pack selected from a plurality of different battery packs. The robot is reconfigured in a cabinet having one or more actuatable arms operable to swap the base with one or more other bases, swap the one or more tool attachments with one or more other tool attachments, and swap the battery pack with one or more other battery packs to build the robot for performing a given task.

20 Claims, 9 Drawing Sheets

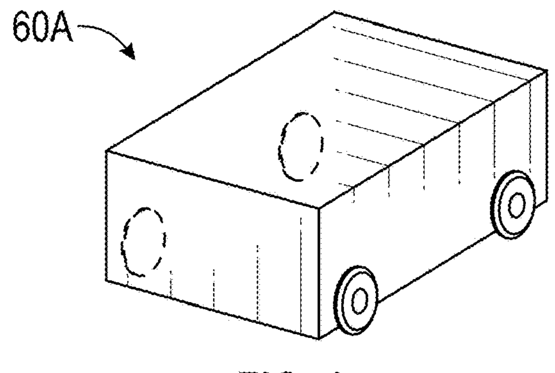
FIG. 4
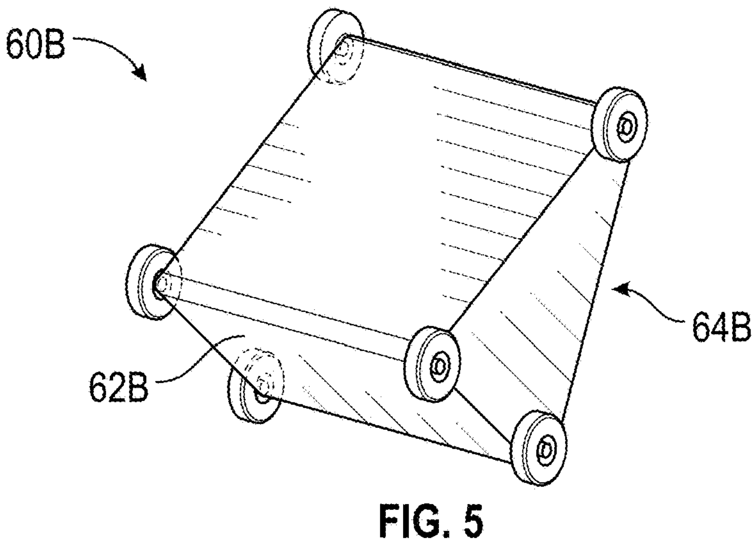
FIG. 5
60C
62C
64C
66C
FIG. 6

K
C
BP
B
FL S H
SW W T
DS HK
BP1 BP2
60A 60B
T

DYNAMICALLY RECONFIGURABLE ROBOT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to a robot and more particularly to a dynamically reconfigurable robot that can configure itself with different swappable parts/attachments to accomplish a given task.

Description of the Related Art

Existing robots are limited in having set form factors and attachments, and are limited in the task(s) they can perform. As such they have limited utility as they are not versatile or able to perform different types of tasks.

SUMMARY

In accordance with an aspect of the disclosure, a dynamically reconfigurable robot is provided. The robot can be given a task, automatically determine the tools/attachments it needs to perform the task, and then enters a robot configuration cabinet where the robot is automatedly (e.g., automatically) reconfigured to have the needed tools/attachments to complete the task the robot has been instructed to perform (e.g., by removing tools/attachments from the robot that are not needed to accomplish the task and adding tools/attachments to the robot for performing the task).

In accordance with another aspect of the disclosure, a dynamically reconfigurable robot is provided, the robot being able to reconfigure itself in a reconfiguration cabinet to perform a given task by removing unneeded tools/attachments and installing needed tools/attachments to complete the task. The reconfiguration cabinet can operate under an open platform, allowing new tools/attachments to be added for use with the robot.

In accordance with another aspect of the disclosure, a dynamically reconfigurable robot system is provided. The robot system comprises a base configured to move over a surface, one or more tool attachments removably couplable to the base, each of the tool attachments configured to perform a different task, and a battery pack detachably coupled to the base and configured to provide power to the base and the one or more tools. The robot system also comprises a cabinet comprising one or more arms operable to swap the base with one or more other bases, swap the one or more tool attachments with one or more other tool attachments, and swap the battery pack with one or more other battery packs to perform a given task. The base, one or more tools and the battery pack are coupled to form the robot and chosen to optimize a size, weight and power requirement of the robot.

In accordance with another aspect of the disclosure, a dynamically reconfigurable robot kit is provided. The kit comprises a plurality of bases, each configured to move over a surface. The kit also comprises a plurality of tool attachments, each configured to perform a task and to be selectively coupled to one of the plurality of bases. The kit also comprises a plurality of battery packs, each configured to be selectively coupled to one of the plurality of bases and to provide power to said one of the plurality of bases and to one or more tool attachments coupled to said one of the plurality of bases, at least two of the plurality of battery packs having a different size.

In accordance with another aspect of the disclosure, a method for building and operating a dynamically reconfigurable robot is provided. The method comprises the steps of: receiving a task, identifying via a computer processor a base from a plurality of bases for performing the task, identifying via the computer processor one or more tools from a plurality of tools for performing the task, and identifying via the computer processor a battery pack for performing the task. The method also includes the step of communicating via the computer processor the identified base, identified one or more tools and identified battery pack to one or more actuatable arms of a cabinet that houses a plurality of bases, a plurality of tools and a plurality of battery packs. The method also includes the step of automatically building a robot for performing the task using the one or more actuatable arms of the cabinet by coupling the base, the one or more tools and the battery pack with the one or more actuatable arms and within the cabinet.

BRIEF DESCRIPTION OF THE DRAWINGS

FIG. 4 is a schematic view of a translating base for the robot.

FIG. 5 is a schematic view of a stair climbing base for the robot.

FIG. 6 is a schematic view of a balancing base for the robot.

DETAILED DESCRIPTION

Figure 1:
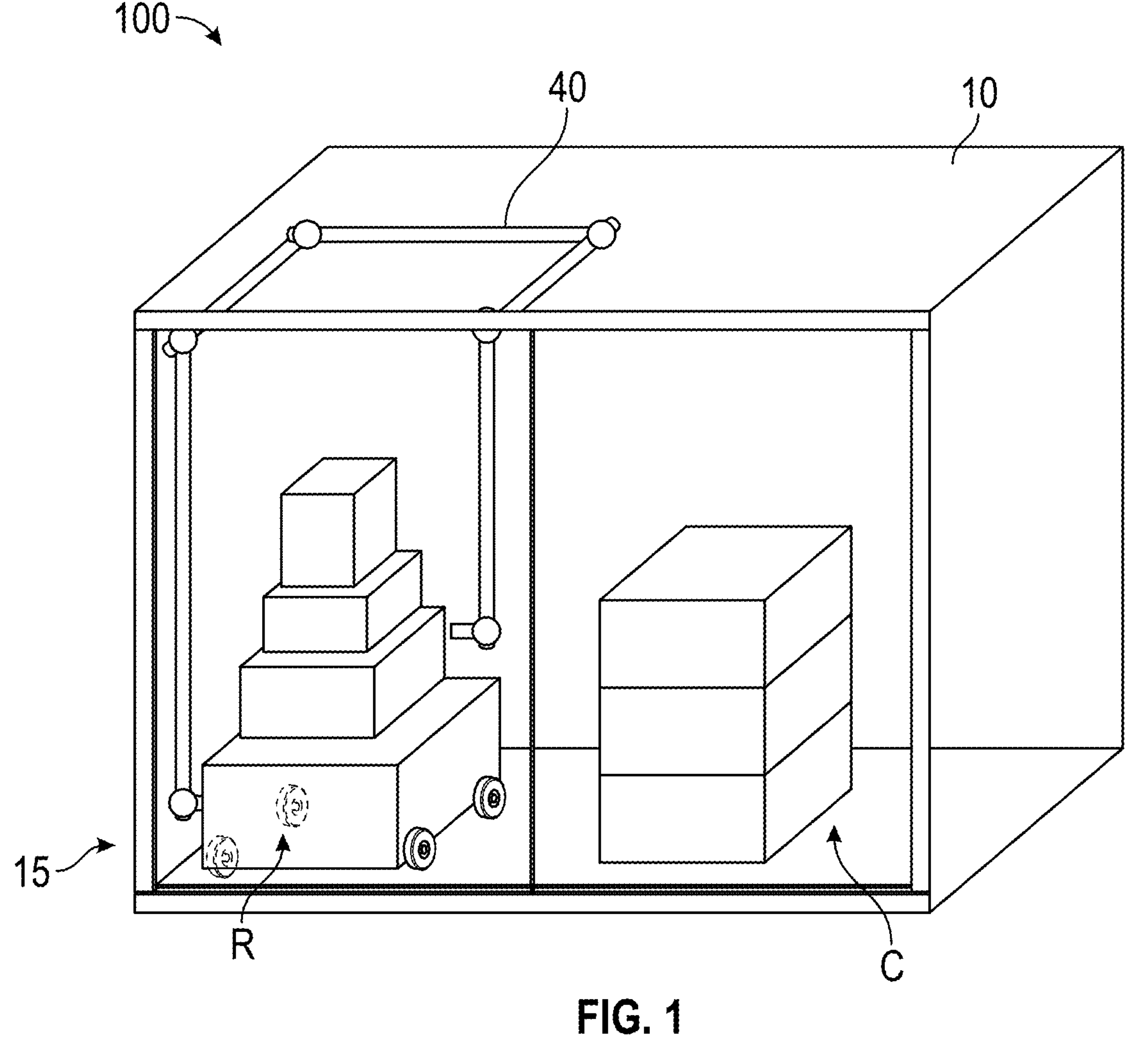
FIG. 1 is a schematic view of a robot configuration cabinet.

FIG. 1 shows a system 100 for dynamically reconfiguring a robot. The system 100 can include a closet or cabinet 10 with one or more (e.g., a pair of) doors (e.g. retractable doors) 15 that selectively allow and disallow access to an interior of the cabinet 10. In one example, the cabinet 10 can be 4 feet tall by 6 feet wide by 2 feet deep. However, the cabinet 10 can have other suitable dimensions.

Figure 2:
FIG. 2 is a schematic partial view of the robot configuration cabinet, showing a rear wall and sidewall and excluding other walls of the cabinet.
Figure 2:
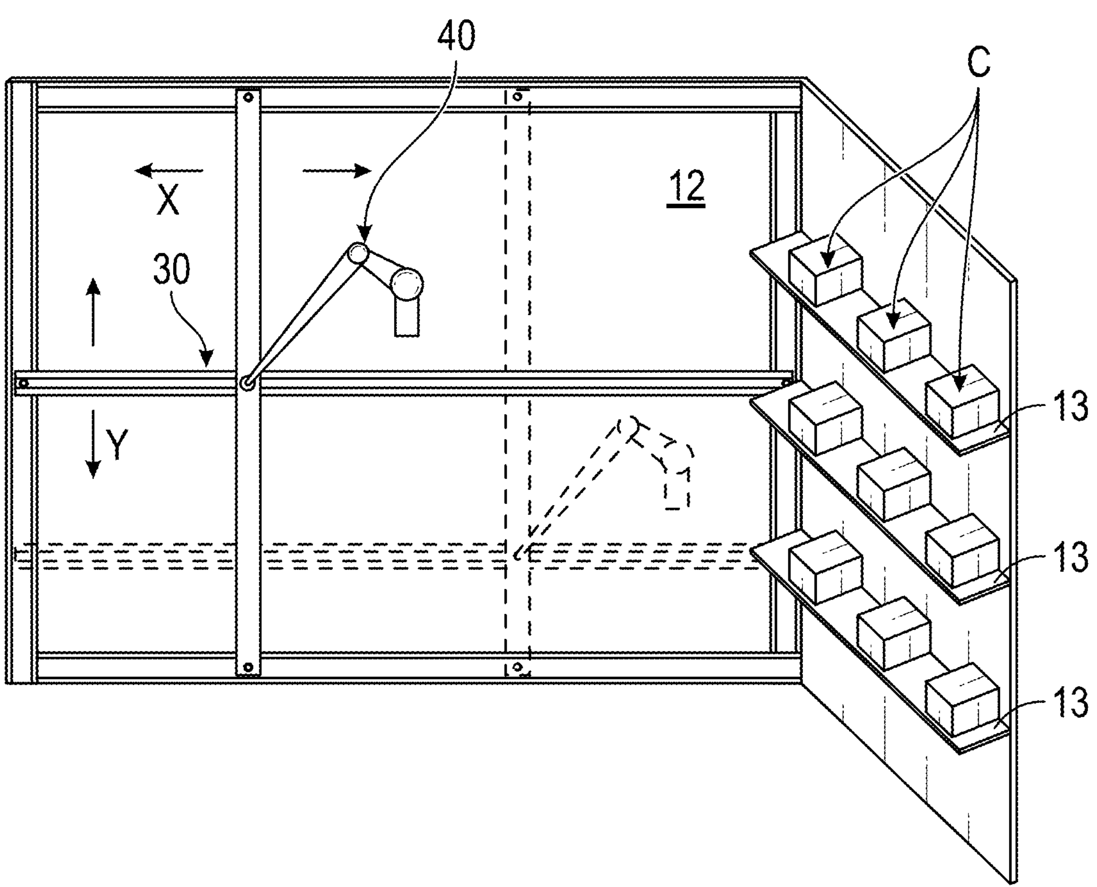

A robot R can enter the cabinet 10 (as shown in FIG. 1) to be automatedly (e.g., automatically) reconfigured to perform a given task, as further described below. Once in the cabinet 10, one or more components or attachments can be removed (e.g., uninstalled) from the robot R and one or more components or attachments needed to perform the given task can be installed in or on the robot R. The cabinet 10 can include an X-Y actuator 30 on a rear wall 12 of the cabinet 10 that can move in an X and Y direction (e.g., up and down, left and right) along the rear wall. FIG. 2 shows two example X-Y positions for the actuator 30, one in solid lines and one in dashed lines offset in an X and Y direction. The X-Y actuator 30 can be a screw actuator. An arm 40 can be attached to the X-Y actuator 30 and operable to uninstall components or attachments C from the robot R (that are not needed for the given task) and move them to one or more shelves 13 or storage locations in the cabinet 10. The arm 40 can select one or more (e.g., multiple) components or attachments (e.g., individual specialized tools or parts for performing individual tasks) from a storage location (e.g., shelves 13) in the cabinet 10 and install them in or on the robot R to thereby provide (e.g., reconfigure) the robot R with the tools, components or attachments needed to complete the given task. The reconfigured robot R can then exit the cabinet 10 and proceed to perform the given task. Once the task is completed and the robot R is given a new task, the robot R can return to the cabinet 10 to be reconfigured again to obtain the tools, components or attachments needed to perform the new task. In one implementation, the arm 40 can be operated to drill, unscrew, or otherwise disconnect or decouple components, attachments or tools C from the robot R and be operated to screw or otherwise connect or couple components, attachments or tools Con, to or within the robot R.

FIGS. 3-7 show example tools, components or attachments C that can be housed in the cabinet 10 and can be selectively installed in or on the robot R (e.g. for use in performing a given task). Such tools (see FIG. 8-10) can include different types of attachments for performing a particular task, such as a saw attachment S for cutting, a drill attachment D for drilling holes, a screwdriver SW attachment for installing or removing screws, a hammer H attachment for installing or removing nails, a wrench W or plyers P attachment for installing or removing bolts, a level L, a hook HK for carrying bags, a tray T to carry objects, a screen (e.g., digital screen) DS to display images, a lifting attachment FL to lift an object, and an actuatable arm A to grab and/or position an object. Components or attachments C can also include battery packs BP1, BP2, BP3, BP4 of different sizes, energy storage capacity, etc.

Figure 3:
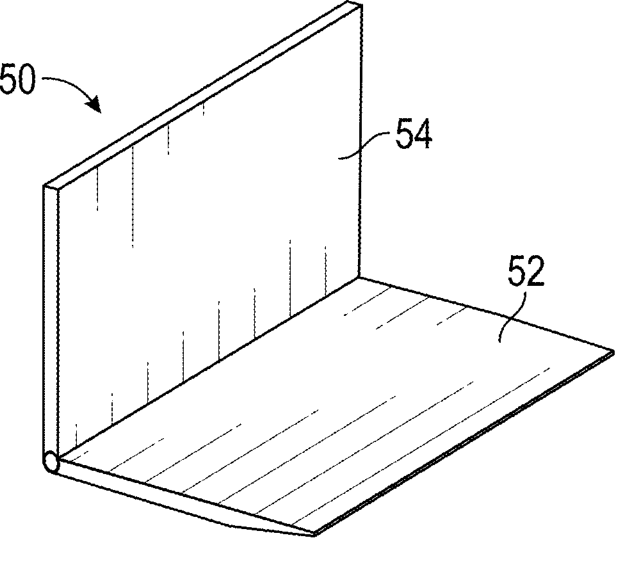
FIG. 3 is a schematic view of a lifting attachment for a robot.
Figure 15:
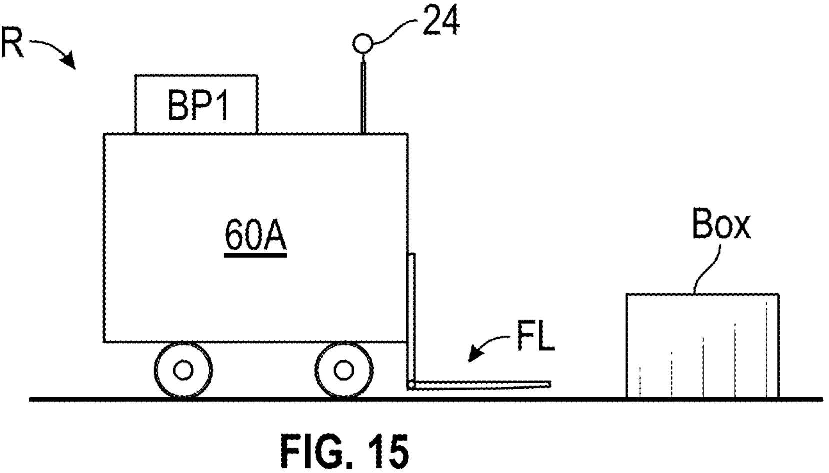
FIG. 15 is a schematic view of an example robot working to perform a task of lifting and transporting a load.
Figure 16:
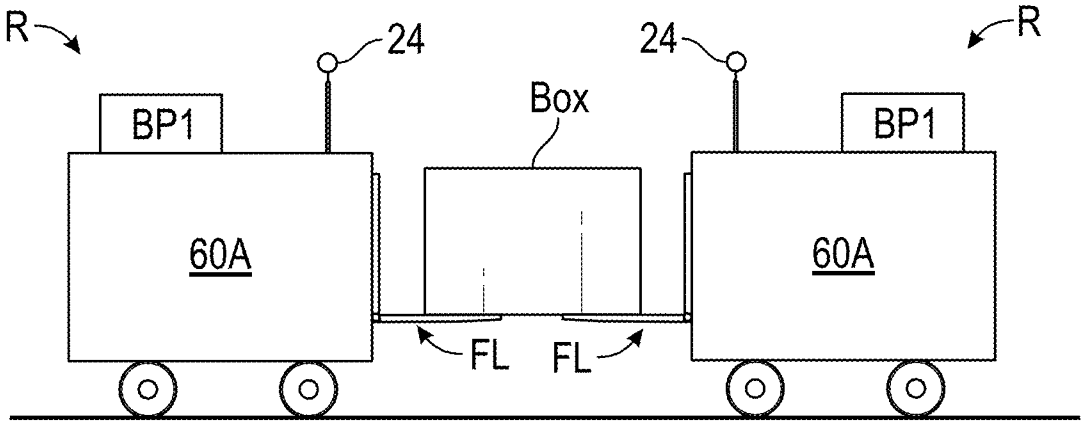
FIG. 16 is a schematic view of two example robots working together to complete a task of lifting and transporting a load.

FIG. 3 shows a lifting attachment 50 that can be selectively coupled to the robot R to allow the robot to perform a lifting or carrying task. The lifting attachment 50 can operate similar to a forklift and have a horizontal portion 52 that can be positioned under an object, the lifting attachment 50 operated to lift the object, allowing the robot R to move (e.g., translate) to transport the lifted object to a different location. In one implementation, the lifting attachment 50 can be foldable; for example, where the horizontal portion 52 can fold onto the vertical portion 54 (e.g., into a retracted position) when not in use or for stowing/storage (e.g., the horizontal portion 52 is hinged relative to the vertical portion 54), and the horizontal portion 52 can fold down to a horizontal orientation (e.g., into an extended position) when in use to lift or carry an object (e.g., as shown in FIG. 15). In one example, multiple robots R with lifting attachment 50 can be used to lift and transport and object (e.g., when the object is too large to be carried by one lifting attachment 50). For example, as shown in FIG. 16, two robots R each having a lifting attachment 50 can lift opposite ends of the object (e.g., large box, couch) and work in unison to transport the object to a desired location.

Figures 7, 8:
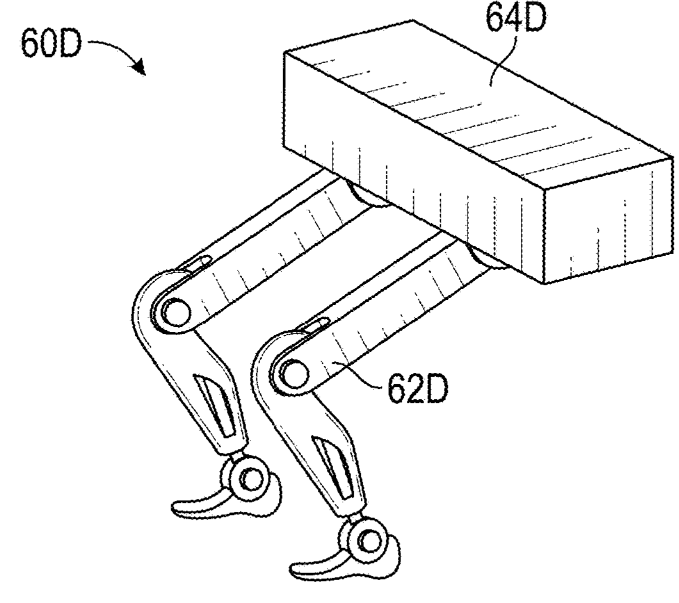
FIG. 7 is a schematic view of a two-legged base for the robot.
FIG. 8 is a schematic view of a kit for a dynamically reconfigurable robot.

FIGS. 4-7 show different bases B (see also FIG. 9) that can optionally be implemented on the robot R to allow the robot R to perform a given task. FIG. 4 shows a base 60A having four wheels that allow the robot R to translate along a surface (e.g., to move along a horizontal surface, such as a floor). In one implementation, the base 60A can have a cuboid shape. However, the base 60A can have other suitable shapes. FIG. 5 shows a base 60B that can allow the robot R to climb up and down stairs. For example, the base 60B can have six wheels (e.g., distributed across two different surfaces, such as a bottom surface 62B and a vertical surface 64B). In one implementation, the base 60B can have a triangular side profile. However, the base 60B can have other suitable shapes. FIG. 6 shows a base 60C that can allow the robot R to balance on two wheels. The base 60C can have a platform 62C spaced above the wheels by sidewalls 64C so as to define a gap or opening 66C under the platform 62C, allowing the base 60C to move over or past obstacles, which can pass through the opening 66C and underneath the platform 62C. FIG. 7 shows a base 60D with two legs 62D movably coupled to a platform 64D, the legs 62D allowing the robot R to climb over items or obstacles or move along uneven ground.

With reference to FIG. 8, in one implementation the dynamically reconfigurable robot R can be provided in a kit K that includes multiple components or attachments C. The components or attachments C can include one or more tools T, one or more battery packs BP and one or more bases B. The one or more battery packs BP can include battery packs BP1, BP2 of different sizes or energy storage capacities. The one or more bases B can include one or more of the bases 60A-60D described above. The one or more tools T can include one or more of the tools described above (e.g., a saw attachment S for cutting, a screwdriver SW attachment for installing or removing screws, a hammer H attachment for installing or removing nails, a wrench W attachment for installing or removing bolts, a hook HK for carrying bags, a tray T to carry objects, a screen DS to display images, a lifting attachment FL). The kit K can have more or fewer components or attachments C than those shown in FIG. 8. In one implementation, the kit K can include the cabinet 10. In another implementation, the kit K can exclude the cabinet 10.

Figure 9:
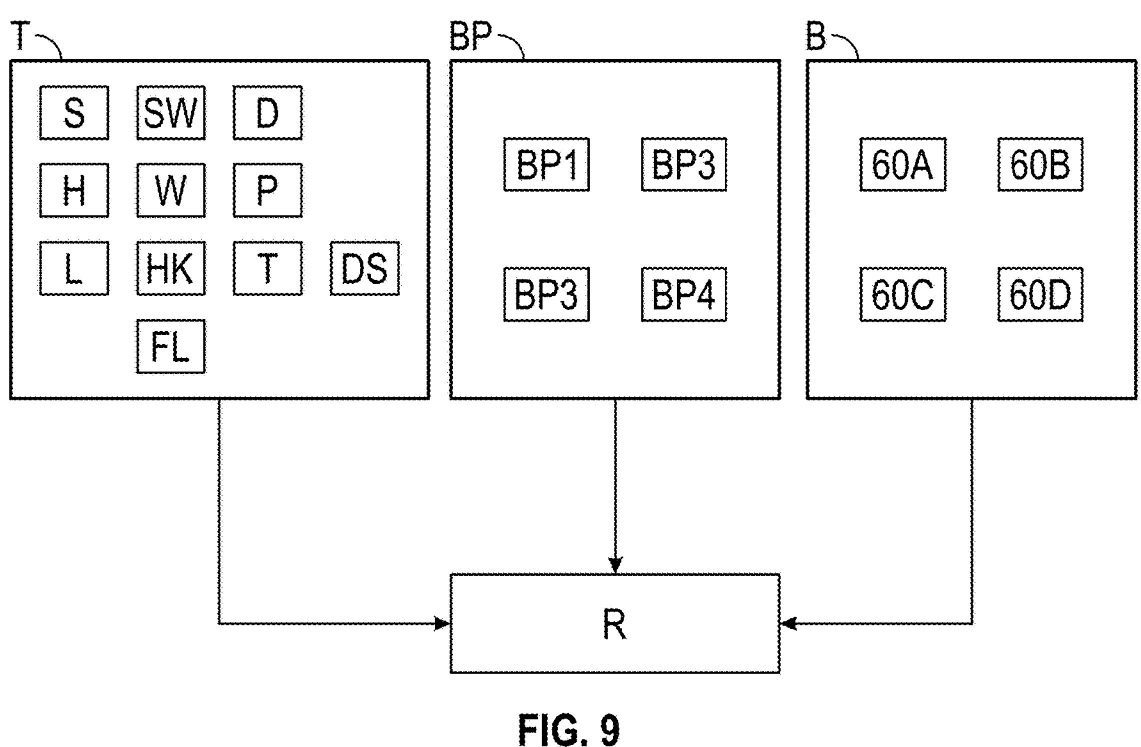
FIG. 9 is a schematic view of the components of the dynamically reconfigurable robot.

FIG. 9 schematically shows the building of the robot R (e.g., that occurs in the cabinet 10), where the robot R is defined by a base B (e.g., chosen from bases, such as bases 60A-60D), a battery pack BP (e.g. chosen from different battery packs, such as battery packs BP1, BP2, BP3, BP4 of different sizes and energy storage capacities) and one or more tools T, where the battery pack BP and one or more tools T are attached on, to or incorporated in the base B to form the robot R.

Figure 10:
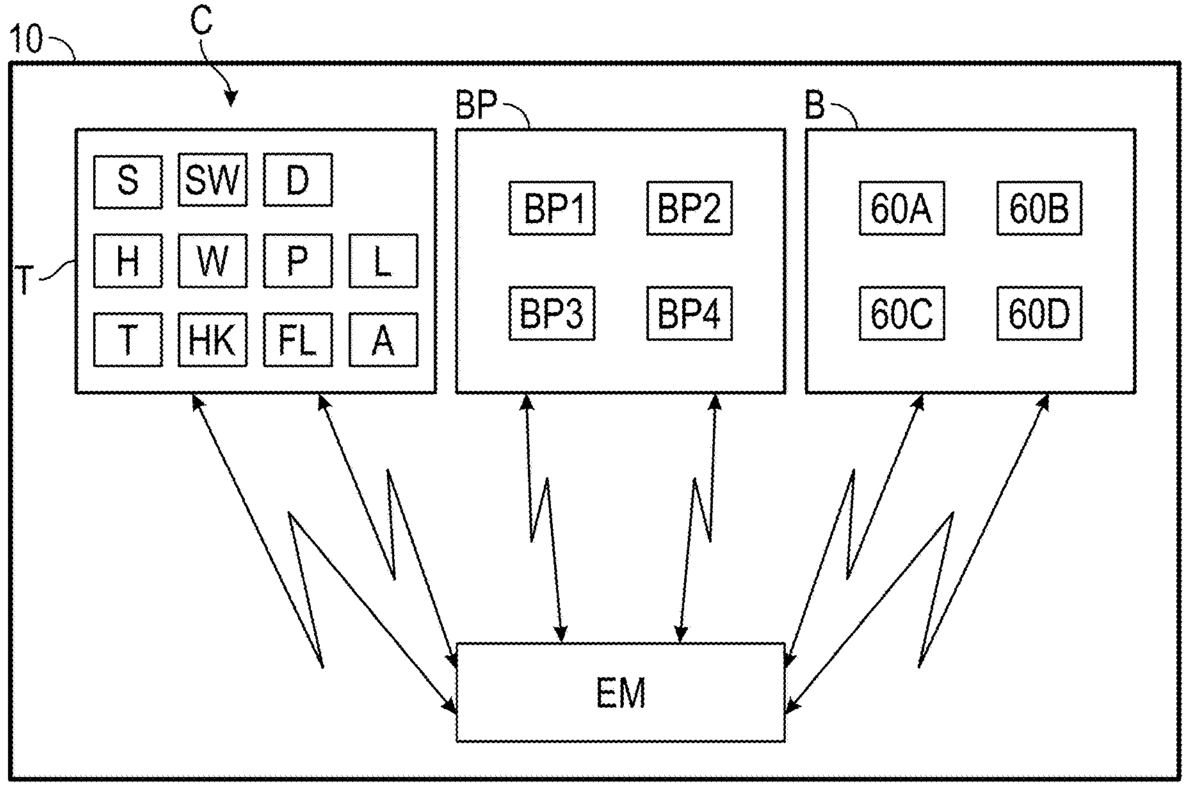
FIG. 10 is a schematic view showing communication between the robot bases, battery packs and tools and the electronics of the cabinet.

FIG. 10 schematically illustrates communication between an electronic controller EM (e.g., central processing unit, one or more processors) of the cabinet 10 and the components C (e.g., tools T, battery packs BP and bases B) in the cabinet 10. For example, each of the tools T, battery packs BP and bases B can have an RFID tag (e.g., a unique RFID tag identifier) and the electronic controller EM can include an RFID reader that can identify the RFID tag of the components C to thereby know which components C are in the cabinet 10 that can be used in reconfiguring the robot R. Additional components can be added to the cabinet 10 (e.g., stored on the shelves 13 thereof), such as by a user, and identified (e.g., via their RFID tag) by the cabinet 10 (e.g., by the cabinet's RFID reader). However, the cabinet 10 can use other mechanisms for identifying the components or attachments C.

Figure 11:
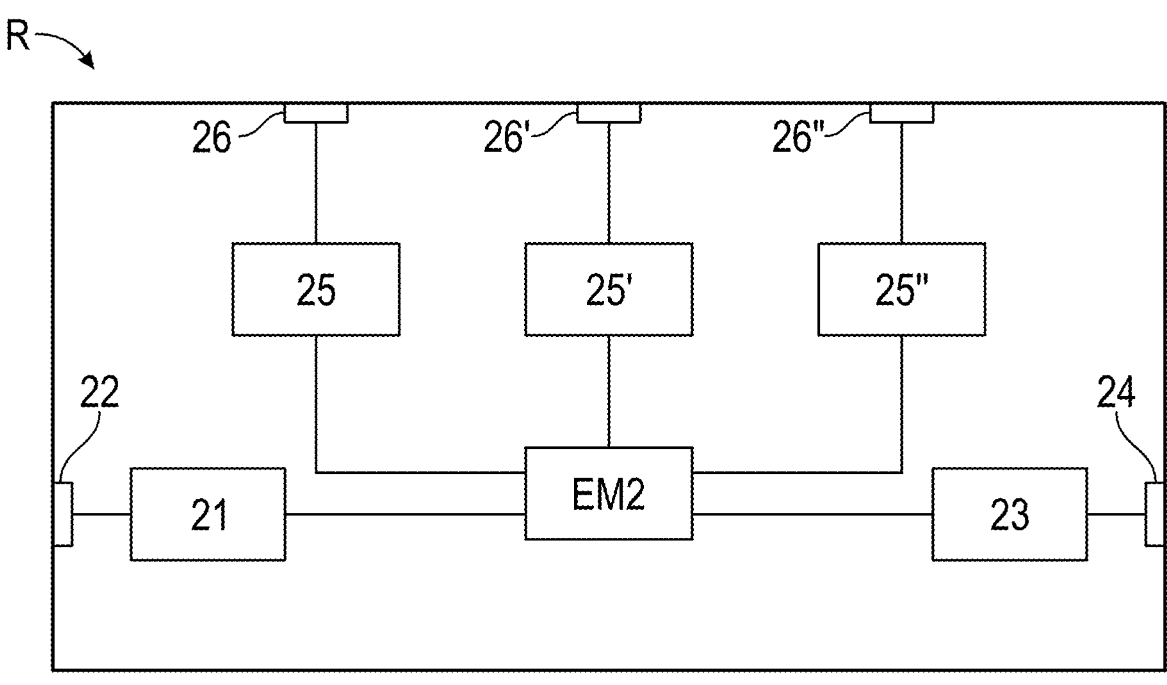
FIG. 11 is a schematic view of electronics of the robot.

FIG. 11 shows a schematic view of electronics of the robot R, which can be housed in the base (e.g., the base 60A-60D). The robot R can have an electronic controller EM2 (e.g., a central processing unit including one or more processors and memory), and a battery interface or control module 21 that interfaces via an electrical connector, port or contact 22 with the battery pack BP attached to or incorporated in the base of the robot R. The robot R also includes a communication module 23 (e.g., transmitter, receiver and/or transceiver) that can communicate (e.g., wirelessly) via an antenna 24, for example with a user or with the electronic controller EM of the cabinet 10. The robot R can also include one or more actuators 25, 25', 25" (e.g., electric motors) operable to operate the tools T coupled to the base of the robot R via corresponding mechanical interfaces 26, 26', 26" (e.g., quick disconnect connections).

Figure 12:
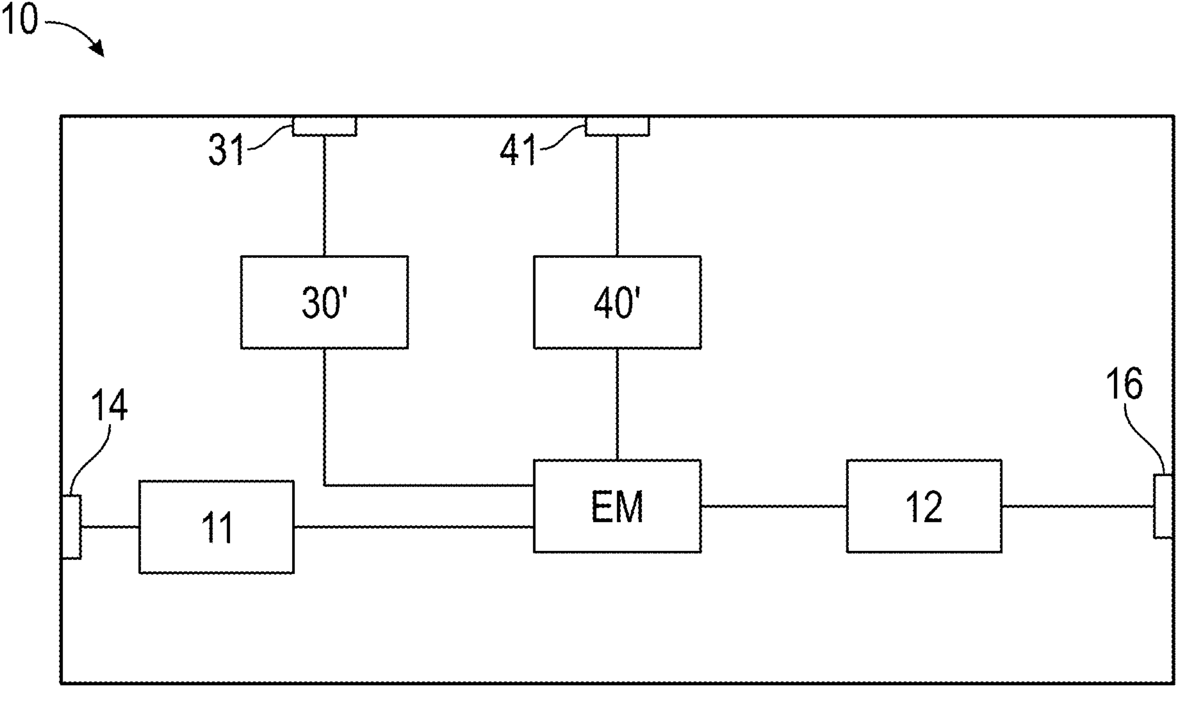
FIG. 12 is a schematic view of the electronics of the cabinet.

FIG. 12 shows a schematic view of electronics of the cabinet 10. The electronic controller EM of the cabinet 10 can include one or more processors and memory, and a power interface or control module 11 that interfaces with a power source (e.g., wall power) via an electrical connector 14. The electronics also includes a communication module 12 (e.g., transmitter, receiver and/or transceiver, RFID reader) that can communicate via an antenna 16, for example, with the electronic controller EM2 of the robot R, can communicate with (e.g., identify) the components C in the cabinet 10, etc. The electronics can also include an actuator 30' (e.g., screw actuator) operable to operate the X-Y actuator 30 via the interface 31, and an actuator 40' (e.g., electric motor) operable to operate the arm 40 via the interface 41.

Figure 13:
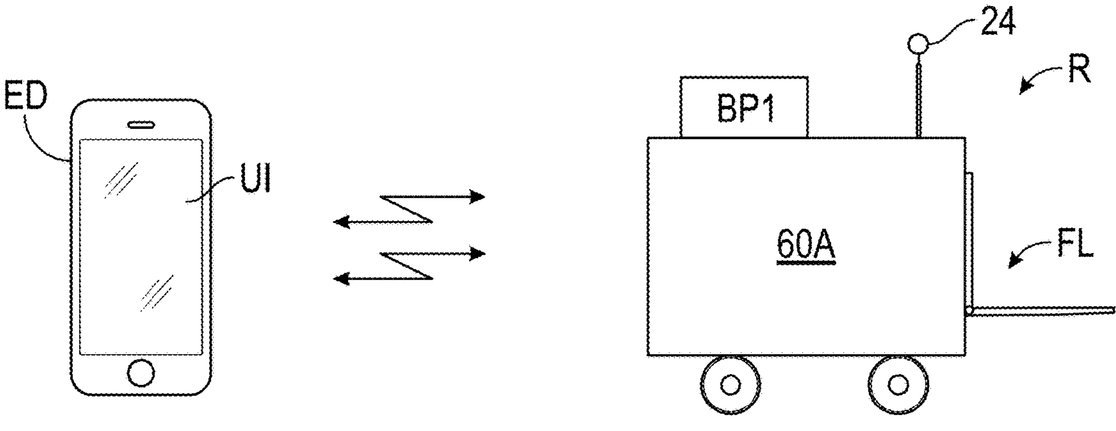
FIG. 13 is a schematic view of an example robot communicating with a user.
Figure 14:
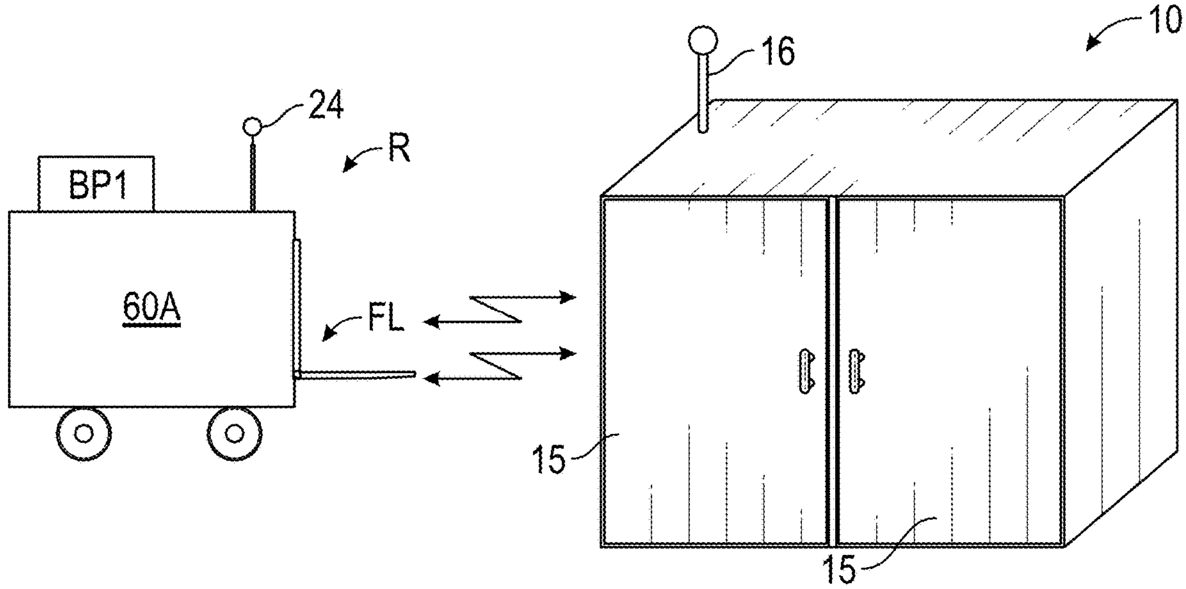
FIG. 14 is a schematic view of an example robot communicating with the cabinet.

FIG. 13 shows one example configuration of the robot R that includes the base 60A, the lifting attachment FL and battery pack BP1. The robot R can communicate (e.g., wirelessly via the antenna 24 and/or communication module 23) with a user (e.g., via a user interface UI). The user interface UI can be in or part of an electronic device ED (e.g., tablet computer, smartphone, laptop computer, desktop computer) operated by a user. FIG. 14 shows the robot R of FIG. 13 communicating with the cabinet 10 (e.g., wirelessly via the antenna 24 and/or communication module 23 that communicates with the antenna 16 of the cabinet 10).

In one example, the user (via the user interface UI) can provide the robot R with a task via the user interface UI of the electronic device ED. The robot R can then communicate with the cabinet 10 to identify the components C needed to perform the task and enter the cabinet 10 to be reconfigured with the components C (e.g., tool(s) T, battery pack BP, base B) needed to perform the task, after which the robot R exits the cabinet 10 and proceeds to perform the task (e.g., lifting a load). In another example, the user (via the user interface UI) can communicate (e.g., wirelessly) the task to the cabinet 10 (e.g., via the antenna 16 of the cabinet 10). The cabinet 10 can then communicate (e.g., wirelessly) with the robot R, which can enter the cabinet 10 to be reconfigured with the components C needed to perform the task. Once the task is completed, the robot R waits for instructions to perform a new task, at which point it again enters the cabinet to be reconfigured to have the components C needed to perform the new task.

FIG. 15 shows the robot R of FIG. 13 in the process of performing a task (e.g., picking-up and transporting a load, such as a box). Additionally, multiple robots can work simultaneously to perform a task. FIG. 16 shows two robots R with the lifting attachment FL working together to lift and transport a load (e.g. a large box).

Advantageously, the system 100 allows the robot R to be reconfigured (e.g., in the cabinet 10) to have only the components C (e.g., tools T) needed to complete a task. Additionally, the robot R can be configured to have the battery pack BP sufficient to complete the task (e.g., a battery pack BP of sufficient size and energy storage capacity). Accordingly, by dynamically reconfiguring the robot R to have the parts needed to perform a given task, the size and weight and power requirements of the robot R for the given task can be optimized (e.g., have a battery pack of only the size and energy storage capacity needed to complete the task), allowing the robot R to operate without carrying excess parts or weight. This can advantageously allow the robot R to operate and complete the task more efficiently. Additionally, the system 100 can advantageously be an open platform system, allowing anyone to add attachments or tools to the cabinet 10 (e.g., which can be identified by the cabinet 10 as discussed above) that the robot R can then be reconfigured to use.

Figure 17:
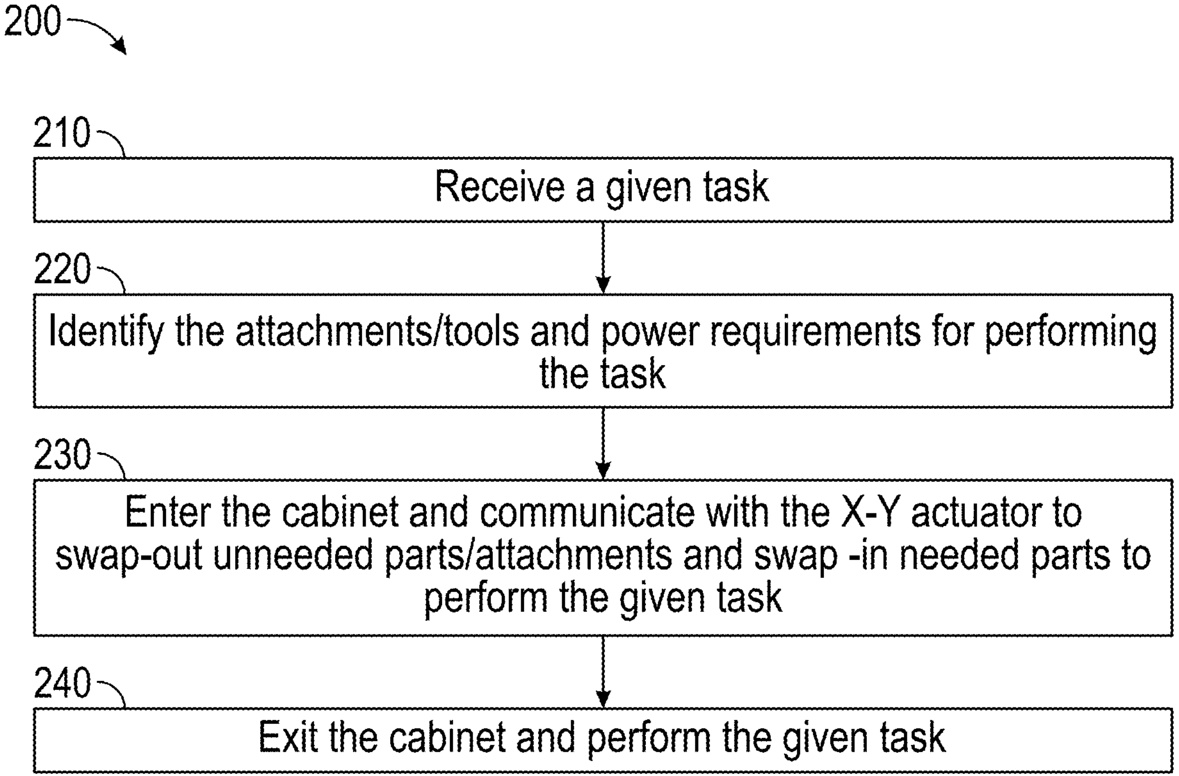
FIG. 17 shows a method of operating a dynamically reconfigurable robot.

FIG. 17 shows a method 200 for operating a dynamically reconfigurable robot (e.g., such as the robot R in the system 100 described above). The method 200 includes the steps of receiving 210 (via a computer processor) a task and identifying 220 (via a computer processor) the attachments/tools and power requirements for performing the given task. The method 200 also includes the step of the robot R entering 230 the cabinet to reconfigure itself. The robot R can communicate with the cabinet (e.g., with the X-Y actuator) to swap-out unneeded parts/attachments and swap-in needed parts/attachments (e.g., battery pack) to perform the given task. The robot R can then exit 240 the cabinet in the reconfigured state and proceed to perform the given task. As discussed herein, the dynamically reconfigurable robot R advantageously reconfigures itself to perform a given task, providing a versatile robot with unlimited functionality.

Additional Embodiments

In embodiments of the present invention, a robot system, kit and method of building the same may be in accordance with any of the following clauses:

Clause 1: A dynamically reconfigurable robot system, comprising:

a base configured to move over a surface;

one or more tool attachments removably couplable to the base, each of the tool attachments configured to perform a different task;

a battery pack detachably coupled to the base and configured to provide power to the base and the one or more tools; and a cabinet comprising one or more arms operable to swap the base with one or more other bases, swap the one or more tool attachments with one or more other tool attachments, and swap the battery pack with one or more other battery packs to perform a given task, wherein the base, one or more tools and the battery pack are coupled to form the robot and chosen to optimize a size, weight and power requirement of the robot.

Clause 2: The robot system of clause 1, wherein the base is a translating base having four wheels.

Clause 3: The robot system of clause 1, wherein the base is a stair climbing base having six wheels.

Clause 4: The robot system of clause 1, wherein the base is a balancing base with two wheels.

Clause 5: The robot system of clause 1, wherein the base is a two-legged base.

Clause 6: The robot system of any preceding clause, wherein the one or more tool attachments is chosen from the group consisting of a saw attachment, a drill attachment, a screwdriver attachment, a hammer attachment, a wrench attachment, a plyers attachment, a level, a hook attachment, a tray attachment, a digital screen, and a forklift attachment.

Clause 7: A dynamically reconfigurable robot kit, comprising:

a plurality of bases, each configured to move over a surface;

a plurality of tool attachments, each configured to perform a task and to be selectively coupled to one of the plurality of bases; and a plurality of battery packs, each configured to be selectively coupled to one of the plurality of bases and to provide power to said one of the plurality of bases and to one or more tool attachments coupled to said one of the plurality of bases, at least two of the plurality of battery packs having a different size.

Clause 8: The robot kit of clause 7, wherein the plurality of bases includes a translating base having four wheels.

Clause 9: The robot kit of clause 7, wherein the plurality of bases includes a stair climbing base having six wheels.

Clause 10: The robot kit of clause 7, wherein the plurality of bases includes a balancing base with two wheels.

Clause 11: The robot kit of clause 7, wherein the plurality of bases includes a two-legged base.

Clause 12: The robot kit of any of clauses 7-11, wherein the plurality of tool attachments are chosen from the group consisting of a saw attachment, a drill attachment, a screwdriver attachment, a hammer attachment, a wrench attachment, a plyers attachment, a level, a hook attachment, a tray attachment, a digital screen, and a forklift attachment.

Clause 13: The robot kit of any of clauses 7-12, further comprising a cabinet configured to house one or more of the plurality of bases, one or more of the plurality of tools and one or more of the plurality of batteries, the cabinet comprising one or more arms operable to swap between the plurality of bases, the plurality of tools and the plurality of batteries to form a robot having one of the plurality of bases, one of the plurality of batteries and one or more of the plurality of tools to perform a task.

Clause 14: A method for building and operating a dynamically reconfigurable robot, comprising:

receiving a task;

identifying via a computer processor a base from a plurality of bases for performing the task;

identifying via the computer processor one or more tools from a plurality of tools for performing the task;

identifying via the computer processor a battery pack for performing the task;

communicating via the computer processor the identified base, identified one or more tools and identified battery pack to one or more actuatable arms of a cabinet that houses a plurality of bases, a plurality of tools and a plurality of battery packs; and automatically building a robot for performing the task using the one or more actuatable arms of the cabinet by coupling the base, the one or more tools and the battery pack with the one or more actuatable arms and within the cabinet.

Clause 15: The method of clause 14, wherein identifying the base comprises choosing a translating base having four wheels, a stair climbing base having six wheels, a balancing base with two wheels or a two-legged base.

Clause 16: The method of any of clauses 14-15, wherein identifying the battery pack comprises selecting one of a plurality of different sized battery packs.

Clause 17: The method of any of clauses 14-16, wherein identifying the one or more tools comprises selecting one or more tools from the group consisting of a saw attachment, a drill attachment, a screwdriver attachment, a hammer attachment, a wrench attachment, a plyers attachment, a level, a hook attachment, a tray attachment, a digital screen, and a forklift attachment.

Clause 18: The method of any of clauses 14-17, wherein automatically building the robot includes swapping out with the one or more actuatable arms another base in a prior configuration of the robot with the identified base, swapping out another one or more tools in the prior configuration of the robot with the identified one or more tools, and swapping out another battery pack in the prior configuration of the robot with the identified battery pack.

Clause 19: The method of any of clauses 14-18, further comprising the robot in a prior configuration entering the cabinet after receiving the task.

Clause 20: The method of any of clauses 14-19, further comprising the robot for performing the task exiting the cabinet.

One or more embodiments disclosed herein may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A dynamically reconfigurable robot system, comprising:

a robot, comprising:

a base configured to move over a surface;

one or more tool attachments removably couplable to the base, each of the tool attachments configured to perform a different task; and a battery pack detachably coupled to the base and configured to provide power to the base and the one or more tool attachments; and a cabinet comprising:

a plurality of storage locations in the cabinet housing a plurality of bases, a plurality of tool attachments and a plurality of battery packs;

one or more actuatable arms in the cabinet operable to access the plurality of bases, the plurality of tool attachments and the plurality of battery packs from the plurality of storage locations in the cabinet; and a controller configured to receive a task request, and based on the task request to:

determine one or more constraints derived from task request, select from the plurality of bases, the plurality of tool attachments and the plurality of battery packs a selected base, one or more selected tool attachments and a selected battery pack that meet the one or more constraints, and operate the one or more actuatable arms to swap, within the cabinet, the base with the selected base, the one or more tool attachments with the one or more selected tool attachments, and the battery pack with the selected battery pack to dynamically configure the robot so that the robot has an optimal configuration with the one or more selected tool attachments being a minimal number of tool attachments, and the selected battery pack having a minimal power capacity, to perform the requested task, wherein the dynamically configured robot is configured to exit the cabinet to perform the requested task.

2. The robot system of claim 1, wherein the base is selected from a group consisting of a translating base having four wheels, a stair climbing base having six wheels, a balancing base with two wheels and a two-legged base.

3. The robot system of claim 1, wherein the one or more tool attachments is chosen from the group consisting of a saw attachment, a drill attachment, a screwdriver attachment, a hammer attachment, a wrench attachment, a plyers attachment, a level, a hook attachment, a tray attachment, a digital screen, and a forklift attachment.

4. A dynamically reconfigurable robot kit, comprising:

a plurality of bases, each configured to move over a surface;

a plurality of tool attachments, each configured to perform a task and to be selectively coupled to one of the plurality of bases;

a plurality of battery packs, each configured to be selectively coupled to one of the plurality of bases and to provide power to said one of the plurality of bases and to one or more tool attachments coupled to said one of the plurality of bases, at least two of the plurality of battery packs having a different power capacity; and a cabinet configured to house the plurality of bases, the plurality of tool attachments and the plurality of battery packs, the cabinet comprising:

a plurality of storage locations in the cabinet housing the plurality of bases, the plurality of tool attachments and the plurality of battery packs;

one or more actuatable arms in the cabinet operable to access the plurality of bases, the plurality of tool attachments and the plurality of battery packs from the plurality of storage locations in the cabinet; and a controller configured to receive a task request, and based on the task request to:

determine one or more constraints derived from task request, select from an inventory of the plurality of bases, the plurality of tool attachments and the plurality of battery packs a selected base, one or more selected tool attachments and a selected battery pack that meet the one or more constraints, and operate the one or more actuatable arms to couple, within the cabinet, the selected base, the one or more selected tool attachments, and the selected battery pack to form a robot having an optimal configuration with the one or more selected tool attachments being a minimal number of tool attachments, and the selected battery pack having a minimal power capacity, to perform the requested task, wherein the robot is configured to exit the cabinet to perform the requested task.

5. The robot kit of claim 4, wherein the plurality of bases includes a translating base having four wheels.

6. The robot kit of claim 4, wherein the plurality of bases includes a stair climbing base having six wheels.

7. The robot kit of claim 4, wherein the plurality of bases includes a balancing base with two wheels.

8. The robot kit of claim 4, wherein the plurality of bases includes a two-legged base.

9. The robot kit of claim 4, wherein the plurality of tool attachments are chosen from the group consisting of a saw attachment, a drill attachment, a screwdriver attachment, a hammer attachment, a wrench attachment, a plyers attachment, a level, a hook attachment, a tray attachment, a digital screen, and a forklift attachment.

10. A method for building and operating a dynamically reconfigurable robot, comprising:

receiving via a computer processor of a cabinet, a task request, the cabinet housing a plurality of different bases, a plurality of different tools and a plurality of different battery packs;

determining via the computer processor one or more constraints from the task request;

identifying via the computer processor a base from the plurality of different bases for performing the task;

identifying via the computer processor one or more tools from the plurality of different tools for performing the task;

identifying via the computer processor a battery pack from the plurality of different battery packs for performing the task, wherein the identified base, the identified one or more tools and the identified battery pack meet the one or more constraints;

communicating via the computer processor the identified base, identified one or more tools and identified battery pack to one or more actuatable arms in the cabinet;

automatically building, within the cabinet and using the one or more actuatable arms, a robot for performing the task by retrieving and coupling together the identified base, the identified one or more tools and the identified battery pack so that the robot has an optimal configuration with the one or more identified tools being a minimal number of tools, and the identified battery pack having a minimal power capacity, to perform the requested task; and causing the robot to exit the cabinet to perform the requested task.

11. The method of claim 10, wherein identifying the base comprises choosing a translating base having four wheels, a stair climbing base having six wheels, a balancing base with two wheels or a two-legged base.

12. The method of claim 10, wherein identifying the battery pack comprises selecting one of a plurality of different sized battery packs.

13. The method of claim 10, wherein identifying the one or more tools comprises selecting one or more tools from the group consisting of a saw attachment, a drill attachment, a screwdriver attachment, a hammer attachment, a wrench attachment, a plyers attachment, a level, a hook attachment, a tray attachment, a digital screen, and a forklift attachment.

14. The method of claim 10, wherein automatically building the robot includes swapping out with the one or more actuatable arms another base in a prior configuration of the robot with the identified base, swapping out another one or more tools in the prior configuration of the robot with the identified one or more tools, and swapping out another battery pack in the prior configuration of the robot with the identified battery pack.

15. The method of claim 10, further comprising the robot in a prior configuration entering the cabinet after receiving the task.

16. The dynamically reconfigurable robot system of claim 1, wherein the controller is configured to keep an inventory of the plurality of bases, the plurality of tool attachments and the plurality of battery packs in the cabinet for use in dynamically configuring the robot.

17. The dynamically reconfigurable robot system of claim 16, wherein the cabinet is configured to accept addition of at least one new component for use in dynamically configuring the robot, the controller configured to identify the at least one new component and to update the inventory to include the at least one new component for use in dynamically configuring the robot for a subsequent task request.

18. The dynamically reconfigurable robot kit of claim 4, wherein the cabinet is configured to accept addition of one or more new components for use in dynamically configuring the robot, the controller configured to identify the one or more new components and to update the inventory to include the one or more new components for use in dynamically configuring the robot for a subsequent task request.

19. The method of claim 10, further comprising maintaining, with the computer processor, an inventory of the plurality of different bases, the plurality of different tools and the plurality of different battery packs in the cabinet for use in building the robot.

20. The method of claim 19, further comprising detecting an addition of a new component inside the cabinet for use in building the robot, and updating the inventory to include the new component for use in building the robot for a subsequent task request.

* * * * *